United States Patent [19]
Kano et al.

[11] Patent Number: 4,631,632
[45] Date of Patent: Dec. 23, 1986

[54] IMPREGNATED CAPACITOR

[75] Inventors: Masafumi Kano, Otsu; Megumu Tanaka, Otsuhachiman; Atsushi Sato, Tokyo; Shigenobu Kawakami, Ichikawa, all of Japan

[73] Assignee: Nippon Petrochemicals Company, Limited, Tokyo, Japan

[21] Appl. No.: 779,697

[22] Filed: Sep. 24, 1985

[30] Foreign Application Priority Data

Sep. 26, 1984 [JP] Japan ................... 59-199419

[51] Int. Cl.$^4$ ............. H01G 4/22; H01G 4/32
[52] U.S. Cl. ..................... 361/315; 252/567
[58] Field of Search ............ 361/327, 314, 433 E, 361/315, 318, 319, 323; 252/567

[56] References Cited

U.S. PATENT DOCUMENTS 4,347,169 8/1982 Sato et al. ............... 361/319 X
4,506,107 3/1985 Sato et al. ............... 361/327 X
4,548,745 10/1985 Yagitani et al. ............ 252/567

Primary Examiner—Donald A. Griffin
Attorney, Agent, or Firm—Scully, Scott, Murphy & Presser

[57] ABSTRACT

Provided is an impregnated capacitor wherein at least part of the capacitor element comprises a metallized polypropylene base film impregnated with an insulating impregnating agent comprising a compound having three condensed or non-condensed aromatic rings, the ratio of the amount of the impregnating agent which penetrates between the base film layers to that of said agent which penetrates into the base film per unit thickness ($\mu$) being at least 60.

6 Claims, 4 Drawing Figures

IMPREGNATED CAPACITOR

BACKGROUND OF THE INVENTION

The present invention relates to an impregnated capacitor comprising a roll of a metallized film impregnated with an insulating impregnating agent. Metallized film capacitors (hereinafter referred to as "MF capacitors") comprising a roll of a metallized film having a vacuum-deposited layer comprising aluminum or the like as an electrode have been used widely in the prior art. This is because the capacitor can be miniaturized in virtue of their excellent self-healing action which facilitates the increase of withstand voltage without insertion of another film between the electrodes. Films used for the production of the MF capacitors include a biaxially oriented polypropylene film (hereinafter referred to as OPP film). This film has been used widely, since it is more inexpensive than other films such as polyester film and it has preferable temperature dependence of dielectric loss.

The MF capacitors now used in practice are mainly so-called dry MF capacitors not impregnated with an insulating impregnating agent such as an insulating oil.

Generally, the potential gradients of not only the capacitors but also various electric appliances are increased when an insulating impregnating agent is present in the environment around the electrode or the conductor. In other words, the withstand voltage is improved advantageously under such a condition. The potential gradient is further increased by employing an impregnating agent having suitable electric properties.

Though the MF capacitors of impregnation type are preferred to those of dry type, the metallized films comprising a polypropylene film as the base film have the following disadvantage: when this film is impregnated with an insulating impregnating agent, the film is deformed or the impregnating agent penetrates between the vacuum-deposited metal layer and the base film bonded physically to each other to form cracks in the metal layer. In an extreme case, the metal layer is peeled off to cause a dielectric breakdown. Since the impregnating agent is applied after the film has been rolled up, the combination of the film and the impregnating agent should be selected suitably; otherwise the impregnating agent would not penetrate sufficiently into the film layers and no impregnation effects could be expected.

The dry MF capacitors have been improved to some extent by impregnating only an end side of the rolled up film and the outer periphery, taking advantage of the fact that the dielectric breakdown is caused at first in said end and outer periphery, leaving the inside thereof non-impregnated to form a semi-dry MF capacitor.

However, the improvement of the function of the semi-dry MF capacitor is limited, since the impregnation is effected only partially and the important surroundings of the electrode layer are not impregnated. Thus, as compared with the impregnated MF capacitors, the semi-dry MF capacitors cannot be said as satisfactory.

Under these circumstances various improvements of the impregnated MF capacitors have been proposed.

For example, Japanese Patent Laid Open No. 36972/1980 has disclosed an impregnated MF capacitor wherein the metallized film swollen with an impregnating agent has a degree of shrinkage of within 0.5%. Great Britain Pat. No. 1451499 has disclosed an oil-impregnated capacitor wherein the rate of length change of the polypropylene film due to the insulating oil at 80° C. is up to 0.5% and the amount of diffusion of the insulating oil into the polypropylene film at 100° C. is up to 10 wt. %.

However, the MF capacitors proposed heretofore are yet insufficient for practical use.

After investigations of the impregnated capacitor by impregnating the MF capacitor comprising the polypropylene film used as the base film with an impregnating agent, the inventors have found that no practical capacitor can be obtained by combining a specified impregnating agent with a polypropylene film selected according to values of dimensional stability of the impregnated film and amount of diffusion of the impregnating agent into the film as mentioned in the specifications of Japanese Patent Laid Open No. 36972/1980 and Great Britain Pat. No. 1451499.

After intensive investigations, the inventors have found surprisingly that it is necessary for obtaining a practical capacitor to combine the base film with the impregnating agent so that the ratio of the amount of the impregnating agent which penetrates between the base film layers to that of said agent which penetrates into the base film wound be within a specified range. Such a fact has not been known in the art.

When the impregnating agent penetrates into the metallized film in the step of impregnating the capacitor element of the roll of the metallized film, the dimension of the film is changed and the impregnating agent diffuses between the metal layer and the base film which are physically bonded to each other to cause the peeling or even dropping of the metal layer. Therefore, not only a high dimensional stability but also minimum penetration of the penetrating agent into the film is required in the penetrating step.

However, on the other hand, it is generally preferred that the impregnating agent is present around the electrode to improve the withstand voltage as mentioned above. In the MF capacitor, the electrode is surrounded by the film and the interlaminar gap. To obtain the sufficient effect of the impregnating agent, therefore, it is necessary that the capacitor element is impregnated with a large amount of the impregnating agent. Thus, the impregnating agent should penetrate into the interlaminar gap of the roll in an amount larger than that which penetrates into the film, since undesirable effects will result when the impregnating agent penetrates into the film in a large amount.

Namely, the penetration of only a small amount of the impregnating agent into the film is preferred from the viewpoint of protection of the vacuum-deposited metal layer, while the penetration of a large amount of said agent into the film and the interlaminar gap is preferred from the viewpoint of the effects of the impregnation.

The amount of the impregnation of the film varies depending on the molecular structure, molecular weight, viscosity, etc. of the impregnating agent. Further, the amount of the impregnation of a given impregnating agent varies also depending on many properties such as isotacticity index (I.I.) of the polypropylene used, degree of crystallization of the film surface which varies depending on a cooling process employed in the course of the preparation of the base film, roughness of the polypropylene film surface and corona discharge treatment.

Therefore, it is indispensable for selecting a suitable combination of the polypropylene base film with the impregnating agent to determine the amount of impregnation by a method which will be described below.

An object of the present invention is to provide a practically usable MF capacitor having a long life and capable of elevating the withstand voltage and contributing to the miniaturization.

The gist of the present invention resides in a capacitor wherein at least part of the capacitor elements comprises a metallized film comprising a polypropylene film as a base film and which is impregnated with an insulating impregnating agent comprising a compound having three condensed or non-condensed aromatic rings, the ratio of the amount of the impregnating agent which penetrates between the base film layers to that of said agent which penetrates into the base film per unit thickness ($\mu$) as determined by the method described below being at least 60.

DESCRIPTION OF THE PREFERRED EMBODIMENTS

Figure 1A:
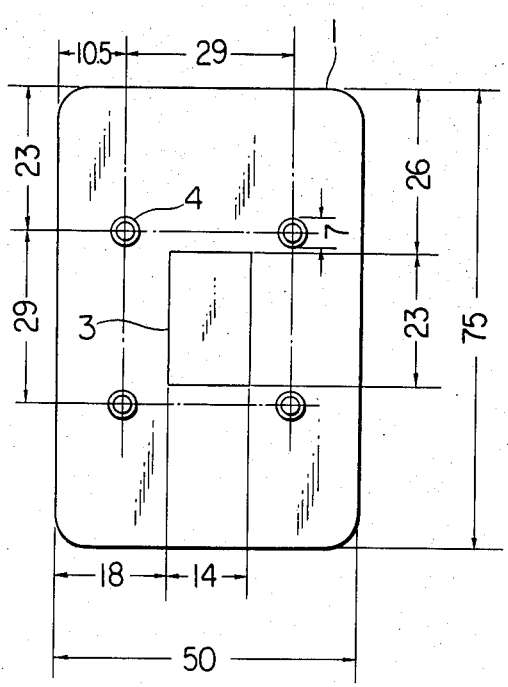

The impregnating agent according to the present invention comprises an insulating compound having three aromatic rings which is either liquid or solid at ambient temperature. The aromatic rings may be either condensed or non-condensed ones. When the compound is solid, it should be liquefied by heating in the impregnation step or it should be soluble in the other liquid impregnating agent to be mixed and used. Typical impregnating agents are aromatic compounds having three rings which may contain an oxygen atom, such as triarylalkanes, diaralkylaromatic hydrocarbons, triaryls, aralkyldiaryls, arylnaphthalenes, aralkylnaphthalenes, condensed tricyclic aromatic hydrocarbons and aromatic ethers.

These compounds may be used either alone or in the form of a mixture of two or more of them.

Some of the preferable compounds such as diarylkyl aromatic hydrocarbons, triaryls and aralkyldiaryls are represented by the following formula (I):

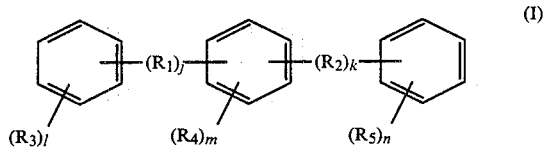

wherein $R_1$ and $R_2$ represent each divalent group derived from a saturated hydrocarbon having 1 to 4 carbon atoms, such as methane, ethane, propane or butane, j and k represent each 0 or 1, $R_3$ to $R_5$ represent each an alkyl group having 1 to 4 carbon atoms such as methyl, ethyl, propyl, isopropyl or butyl, and l, m and n represent each an integer of 0 to 3.

Examples of the diaralkyl aromatic hydrocarbons include dibenzyl toluene, dibenzyl xylene, dibenzylethylbenzene, dibenzyl cumene, benzyl-methylbenzylbenzene, benzyl-ethylbenzylbenzene, benzyldimethylbenzylbenzene, benzyl-propylbenzylbenzene, 1-tolyl-1-benzylphenyl-ethane, 1-xylyl-1-benzylphenylethane, 1-ethylphenyl-1-benzylphenyl-ethane, 1-cumenyl-1-benzylphenyl-ethane, 1-phenyl-1-methylbenzylphenyl-ethane, 1-phenyl-1-dimethylbenzylphenyl-ethane, 1-phenyl-1-ethylbenzylphenyl-ethane, 1-phenyl-1-propylbenzylphenyl-ethane, 1-phenyl-1-benzyltolyl-ethane, 1-phenyl-1-benzylxylyl-ethane, 1-phenyl-1-benzylethyl-phenyl-ethane, 1-phenyl-1-benzylcumenyl-ethane, di($\alpha$-methylbenzyl)benzene, $\alpha$-methylbenzyl-(methyl-$\alpha$-methylbenzyl)benzene, $\alpha$-methylbenzyl-(dimethyl-$\alpha$-methylbenzyl)benzene, $\alpha$-methylbenzyl-(ethyl-$\alpha$-methylbenzyl)benzene, $\alpha$-methylbenzyl-(propyl-$\alpha$-methylbenzyl)benzene, di($\alpha$-methylbenzyl)toluene, di($\alpha$-methylbenzyl)xylene, di($\alpha$-methylbenzyl)ethylbenzene, di($\alpha$-methylbenzyl)cumene and the like.

Examples of the triaryls and aralkyldiaryls include 4-isopropyl-m-terphenyl, 3-butyl-m-terphenyl, 2-phenylethyl-biphenyl and the like.

Examples of the arylnaphthalenes and aralkylnaphthalenes include the compounds represented by the formula (II)

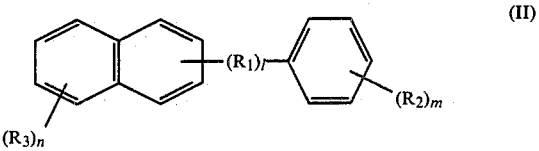

wherein $R_1$ represents a divalent group derived from a saturated hydrocarbon having 1 to 4 carbon atoms, such as methane, ethane, propane or butane, l represents 0 or 1, $R_2$ and $R_3$ represent each an alkyl group having 1 to 4 carbon atoms or a cycloalkyl, and m and n represent each an integer of 0 to 3.

Examples of the compounds of the formula (II) include 1-(ethylphenyl)-naphthalene, 1-benzyl-2-methyl-naphthalene, 1-benzyl-4-methyl-naphthalene, 1-methyl-3-(o-tolyl)-naphthalene, 1-methyl-3-(p-tolyl)-naphthalene, 1-methyl-4-(phenylethyl)-naphthalene, 2,7-dimethyl-(p-tolyl)-naphthalene, 2-(1-(o-tolyl)-ethyl)-naphthalene and the like.

Examples of the aromatic hydrocarbons having three rings other than those having the general formula (I) and (II) include triarylalkanes which are hydrogenated products of trimers of styrenes such as styrene, vinyl toluene, $\alpha$-methyl styrene and the like.

Further, the aromatic hydrocarbons having three rings of the present invention include oxygen-containing tricyclic aromatic hydrocarbons such as aromatic ethers having three aromatic rings.

Examples of the aromatic ethers include tricyclic aromatic compounds substituted the above mentioned tricyclic aromatic hydrocarbons with an alkoxy or cycloalkoxy group such as methoxy, ethoxy, propoxy and the like.

Further, exemplified are diarylalkanes, diaryls and naphthalenes substituted with an aryloxy or aralkyloxy group represented by Ar—O— or Ara—O— respectively, wherein Ar represents an aryl group and Ara an aralkyl group. Examples of the aryloxy groups include phenoxy, methylphenoxy, dimethylphenoxy, ethylphenoxy, isopropoxyphenoxy and the like.

Examples of the aralkyloxy groups include phenyl-methoxy, phenyl-ethoxy, phenyl-propoxy and the like.

Examples of the oxygen-containing tricyclic aromatic hydrocarbons include phenylethyl-2-biphenyl-ether, (2-benzylphenyl)-benzyl-ether, (4-benzylphenyl)-benzyl-ether, diphenylmethyl-(o-tolyl)-ether, (4-biphenylylmethyl)-benzyl-ether, (2-biphenylmethyl)-benzyl-ether and the like.

In the production of the oil-impregnated MF capacitors, an impregnating agent having a molecular weight of less than 400, preferably less than 350 is suitably selected from the above mentioned impregnating agents.

The impregnating agent of the present invention having three aromatic rings have a gas-absorptivity higher than that of wax, polybutene, phthalates such as dioctylphthalate (DOP), animal or vegetable oils such as castor oil and alkylbenzenes used in practice as the impregnating agents for the MF capacitors. Therefore, the MF capacitor impregnated with the impregnating agent of the present invention has an excellent corona (partial) discharge property.

In the production of the MF capacitor by impregnating the capacitor element comprising the metallized polypropylene film with the above-mentioned impregnating agent according to the present invention, it is important to select the combination of the polypropylene base film used as a dielectric of the capacitor with the impregnating agent so that the ratio of the amount of the impregnating agent which penetrates between the base film layers to thatt of said agent which penetrates into the base film per unit thickness ($\mu$) is at least 60, preferably at least 70. Though the higher limit of the ratio is not particularly provided, a ratio of up to 90 is sufficient in general.

The term "base film" herein refers to a polypropylene film part of the metallized polypropylene film comprising the vacuum-deposited metal layer and the polypropylene film. This term refers to, therefore, both the film not yet metallized and the metallized film from which the vacuum-deposited metal layer has been removed.

The base film of the metallized film used in the present invention comprises polypropylene. Though the orientation of the polypropylene film and degree thereof are not particularly limited, a biaxially oriented film is preferred. The film surface may be either smooth or rough. The surface may be roughened by an ordinary embossing surface treatment or by controlling the cooling process to control the surface crystallizability in the course of the preparation of the film. Either one or both surfaces of the film may be roughened. It is thus necessary to select the film suitably in combination with said impregnating agent. A film having at least one roughened surface is preferred. Further, the film surface is preferably treated by corona discharge to improve adhesion of the vacuum-deposited metal layer thereto.

As mentioned above, impregnancy of the base film is affected by properties of polypropylene itself and preparation methods of the film and the like. The factors which affect the impregnancy of the film itself are, for example, crystal types, amounts of crystals, crystal size and isotactic indices of polypropylene, chilling methods in the course of the production of the film, orientation methods, if needed, and the like.

Therefore, it is important to select the suitable polypropylene itself, the production methods of the film and the orientation methods, if needed, to meet the abovementioned relation with the impregnating agent.

The particularly preferably polypropylene film used as the base film in the present invention may be produced by the following process. Of course, the present invention is not limited to this process. Polypropylene having I.I. of about 98.0–99.6% is supplied into an extruder equipped with a T die previously adjusted the temperature to 240°–280° C., extruded therefrom in the form of a sheet having a thickness of 400–800$\mu$ and wound on a chill roll having a surface temperature of 60°–90° C. The sheet thus obtained is stretched to 4.0 to 5.5 times in the longitudinal direction (MD direction) at a temperature of 130°–155° C. and 7.0–11.0 times in the transverse direction (TD direction), and the film thus formed is heat-treated at a temperature of 130°–160° C. while somewhat relaxing. Then, the film is subjected to a corona discharge treatment at 7.0–14.0 W/m$^2$/min.

The metallization may be effected on either one or both surfaces of the film. Though the metal to be used is not particularly limited, aluminum, zinc or their alloy is preferred in general. The process for the metallization of the base film is also not particularly limited and any of electric melting vacuum deposition, ion beam vacuum deposition, sputtering and ion plating processes may be employed. The thickness of the deposited metal layer is generally in the range of 100 to 5,000 Å.

The polypropylene film thus metallized is rolled up to form a capacitor element. If necessary, one or more polypropylene films or an insulating paper may be placed on the metallized film to form layers to be rolled. The capacitor element thus formed is then impregnated with the impregnating agent heated, if necessary, by an ordinary process to obtain the MF capacitor of the present invention.

The impregnating agent may contain a known antioxidant as an insulating oil in a suitable amount, e.g., 0.001 to 5 wt. %, preferably 0.01 to 2.0 wt. %.

The antioxidants include, for example, phenols such as 2,6-di-tert-butyl-p-cresol (trade name: BHT), 2,2'-methylenebis(4-methyl-6-tert-butylphenyl), 4,4'-butylidenebis(3-methyl-6-tert-butylphenyl), 4,4'-thiobis(3-methyl-6-tert-butylphenol), stearyl-$\beta$-(3,5-di-tert-butyl-4-hydroxyphenyl)propionate (trade name: Irganox 1076), tetrakis methylene-3-(3',5'-di-tert-butyl-4'-hydroxyphenyl)propionate methane (trade name: Irganox 1010), 1,3,5-trimethyl-2,4,6-tris(3,5-di-tert-butyl-4-hydroxybenzyl)benzene (trade name: Ionox 330) and 1,1,3-tris(2-methyl-4-hydroxy-5-tert-butylphenyl)butane (trade name: Topanol CA); sulfur-containing compounds such as dilauryl thiodipropionate, distearyl thiodipropionate, lauryl stearyl thiodipropionate and dimyristyl thiodipropionate; and phosphorus-containing compounds such as triisodecyl phosphite, diphenyl isodecyl phosphite, triphenyl phosphite and trinonylphenyl phosphite. These antioxidants may be used either alone or in the form of a suitable mixture of two or more of them. A phosphoric acid ester or epoxy compound known as additive for an insulating oil may be incorporated therein for the purpose of imparting flame retardancy thereto or the like.

FIGURES

According to the present invention, the ratio of the amount of the impregnating agent which penetrates between the film layers and that of the same agent which penetrates into the film measured by the following process should be at least 60. A cell used for measuring the infrared absorption spectrum is shown in FIG. 1 and FIG 2.

Figure 1B:
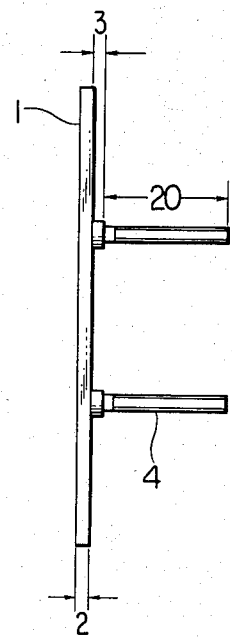

FIG. 1-A is a front view of a frame (male form) for the infrared spectrum measurement cell used in the present invention.

FIG. 1-B is a side view of said frame.

Figure 2A:
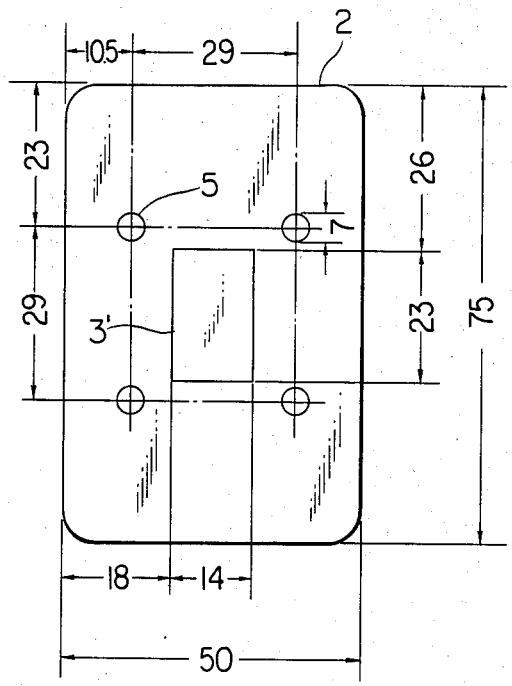
Figure 2B:
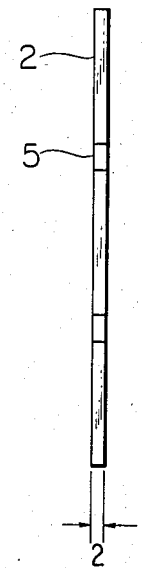

FIG. 2-A is a front view of a frame (female form) for the cell.

FIG. 2-B is a side view of said frame.

The cell comprises the frame (male form) 1 for the cell shown in FIG. 1-A (weight of 64 g.) and the frame (female form) 2 (weight of 55 g.) for the cell shown in FIG. 2-A, the two frames being to be fitted with each other. The frames 1 and 2 are made of stainless steel and have a rectangular shape having a size of 50 mm×75 mm and a thickness of 2 mm. An eyehole 3 in frame 1 and an eyehold 3' in frame 2 for the measurement having a size of 14 mm×23 mm are provided at the center of the frame. The frame 1 has four bolts 4 which are to be inserted into through-holes 5 in the corresponding positions in the frame 2 to fit the frames 1 and 2 with each other. They are fastened with nuts (not shown) to form the measurement cell. The bolts are threaded according to ISO-261 (metric coarse screw thread for general use according to JIS B 1111-74). The nominal dimension of them is 7 mm.

(Measurement of the Amount of Impregnating Agent which Penetrated Between the Base Film Layers)

Two commercially aviable NaCl discs (30 mm in diameter and 5 mm in thickness) for infrared absorption spectrum determination are used. Two square pieces slightly larger than the discs are cut out of the polypropylene base film (thickness of usually about 5 to 20 $\mu$). The size of the pieces is 35 mm×35 mm.

One of the film pieces is put on the NaCl disc placed over the eyehole 3 of the frame 1. The impregnating agent is dropped onto substantially the center of the film piece in an amount sufficient for wetting the whole surface of the film (generally about 2 $\mu$l is enough) with a microsyringe. At this time the impregnating agent is at about 80° C. The other film piece is placed thereon just after the dropping. When the two faces of the film are not similar, the films are put together in the same manner as in the preparation of the capacitor element.

The other NaCl disc is placed thereon. The bolts 4 are inserted into the through-holes 5 of the frame 2 to fit the frames with each other and to set the cell. Then, the nuts are fastened with a torque wrench at a torque of 1.0 kg.f.cm to effect the screwing. A cell is thus formed.

It takes 30 seconds or less to form the cell from sucking the impregnating agent for the dropping so that the impregnating agent is sufficiently spreaded between the film layers and the measurement of the amount of the impregnating agent can be conducted in good reproducibility.

It must be confirmed previously that when the NaCl disc and the film pieces are not interposed between the frames, the screwing to fit the frames can be effected at a torque of 0.2 kg.f.cm or less.

The measurement cell thus formed is fixed in an I.R. absorption spectrum measurement device (I.R. Spectrophotometer 260-30; a product of Hitachi Ltd.). An absorbance $I_1$ of the sample is determined at a suitable wave number in a characteristic absorption band peculiar to the impregnating agent. A suitable wave number is, for example, 700 cm$^{-1}$ for many compounds such as phenyl-ethyl-benzyl-toluene.

The measurement is effected at room temperature in 30 min. or less after the impregnating agent has been dropped onto the film.

Under the above-mentioned measurement conditions, the amount of the impregnating agent which penetrates into the film is substantially 0 (zero) and, accordingly, no compensation for the amount the penetration into the film is necessary.

(Measurement of the Amount of the Impregnating Agent Penetrated into the Film)

The square polypropylene film piece (35 mm×35 mm) is immersed in the impregnating agent at 80° C. for 20 hrs. The immersed film piece is taken out at room temperature and interposed between two filter papers of Standard 5C (diameter of 150 mm) placed on a smooth glass plate. A glass plate having a size of 200 mm×200 mm and a weight of 450 g. is placed thereon. A weight of 500 g. is further placed thereon. The two filter papers are exchanged ten times at intervals of 5 min to remove the impregnating agent from the film surface by absorption.

The film with the surface freed from the impregnating agent is then interposed between the above mentioned two NaCl discs and further interposed between the frames 1 and 2 to form a measurement cell. The absorbance is determined with the IR absorption spectrum measuring device in the same manner as above. The absorbance thus obtained is divided by a thickness ($\mu$) of the film measured with a micrometer prior to the immersion to obtain a value $I_2$. The absorbance is to be measured at the same wave-number as above.

When the measurement is completed within 3 hrs after taking the film from the impregnating agent at room temperature, a high reproducibility of the measurement results can be obtained without dispersion due to bleeding or evaporation of the impregnating agent.

The ratio of the amount of the impregnating agent which penetrated between the base film layers to that which penetrated into the base film per unit thickness ($\mu$) is represented by the ratio of the above-mentioned $I_1$ to $I_2$.

EXAMPLE (Measurement of the Amount of the Impregnating Agent which Penetrated Between the Base Film Layers and that which Penetrated into the Film)

The polypropylene base films used herein are as follows:

Film A: Polypropylene homopolymer of I.I. 99.2% was extruded from an extruder equipped with a T-die having a width of 660 mm and a gap of 1.2 mm at an extrusion temperature of 250° C. in the form of a sheet, cooled by means of a chill roll having a temperature of 80° C., then stretched to 5.0 times in the longitudinal direction at 145° C. and 9.0 times in the transverse direction and then subjected to a relaxing treatment at 150° C. The film was then subjected to a corona discharge treatment at 100 W/m$^2$/min. The average surface roughness Ra (a value at a cut-off value of 0.25 mm in accordance with JIS-B-0611) of the film thus obtained was 0.32$\mu$.

Film B is a film having Ra of 0.32$\mu$ which was produced in the same manner as above by using polypropylene of I.I. 97.2%.

Film C is a commercially available film having Ra of 0.28$\mu$ which was produced from polypropylene of I.I. 96.5% by a simultaneous biaxially stretching method.

Above three polypropylene base films, i.e. biaxially oriented polypropylene basefilms A, B and C for MF capacitor were used. As the impregnating agent, the following four tricyclic aromatic hydrocarbons were used. The ratio of the amount of the interlaminar impregnation to that penetrated into the film was determined by the above-mentioned process. The results are shown in Table 1. In the measurement, the films used were square (35 mm×35 mm) and had a thickness of 15$\mu$ prior to the measurement. The amount of the impregnating agent dropped by means of the microsyringe in the determination of the interlaminar amount was about 2 $\mu$l.

The used impregnating agents are as follows:

| Impregnating Agent | Type |
| --- | --- |
| ① | dibenzyltoluene |
| ② | 2-biphenyl-benzyl-ether |
| ③ | An aromatic hydrocarbon oil containing mainly di(arylethyl)-aryls and having an average molecular weight of about 320. |
| ④ | (1-phenylethyl)-benzyl-toluene |

For reference, rates of length change (ratios of linear expansion) of films A, B and C in Impregnating Agent ④ at 80° C. and the amount of the diffusion of ④ into the films at 100° C. were examined.

The results are shown in Table 2.

TABLE 1

Ratio of the amount of the impregnating agent which penetrated between the base film layers and that which penetrated into the film.

| Film | Impregnating Agent | | | |
| --- | --- | --- | --- | --- |
| | ① | ② | ③ | ④ |
| Film A | 65.6 | 82.8 | 73.2 | 78.6 |
| Film B | 51.6 | 66.3 | 56.6 | 60.2 |
| Film C | 49.6 | 58.4 | 47.1 | 57.4 |

TABLE 2

Ratio of change of the film length and amount of diffusion*

| Film | Rate of change in Impregnating Agent ④ at 80° C. (%) (machine direction) | Amount of diffusion of Impregnating Agent ④ at 100° C. (wt. %) |
| --- | --- | --- |
| Film A | 1.0 | −3.1 |
| Film B | 1.3 | −3.1 |
| Film C | −0.7 | −3.5 |

*The measurement was effected by a process disclosed in Great Britain Patent No. 1451499.

(Preparation of Impregnated MF Capacitor and Measurement)

An aluminum layer was formed on one surface of each of the above-mentioned base films A, B and C by an ordinary vacuum deposition process to obtain metallized films having a width of 40 mm and a margin 3 mm. The film was rolled up to form a capacitor element, which was then impregnated with an impregnating agent selected from the group consisting of the above-mentioned ① to ④ at 80° C. to obtain MF capacitor having a capacity of about 5 μF.

For comparison, capacitors impregnated with polybutene, and phenylxylylethane (PXE) were prepared in the same manner as above.

The capacitors were evaluated by charging with a given voltage at 80° C. and measuring an average time (hr) required until a half number of the capacitors of the same film and oil were broken.

The results are summarized in Table 3. In Table 3, the absissae are represented by V/μ (voltage gradient), the values indicate time (hour), a symbol ◯ indicates no breakage after 500 hrs or longer and a symbol X indicates the breakage within 1 hr.

TABLE 3

| Experiment No. | Film | Impregnating agent | 60 V/μ | 70 | 80 | 90 | 100 | 110 | 120 | 130 | 140 |
| --- | --- | --- | --- | --- | --- | --- | --- | --- | --- | --- | --- |
| 1 | A | 1 | | | | | ◉ | ◉ | 241 | 93 | 27 | X |
| 2 | A | 2 | | | | | ◉ | ◉ | 357 | 113 | 77 | X |
| 3 | A | 3 | | | | | ◉ | ◉ | 320 | 155 | 52 | X |
| 4 | A | 4 | | | | | ◉ | ◉ | ◉ | 370 | 110 | X |
| 5 | A | PXE | | | ◉ | ◉ | 410 | 100 | X | | |
| 6 | A | polybutene | ◉ | 300 | 120 | X | X | | | | |
| 7 | B | 1 | | | ◉ | 205 | 153 | 51 | X | X | |
| 8 | B | 2 | | | | | 213 | 95 | 11 | X | X |
| 9 | B | 3 | | | ◉ | 305 | 131 | 15 | X | X | |
| 10 | B | 4 | | | ◉ | ◉ | 251 | 106 | 51 | X | X |
| 11 | B | PXE | ◉ | 315 | 124 | 10 | X | | | | |
| 12 | B | polybutene | ◉ | 353 | 91 | X | X | | | | |
| 13 | C | 1 | | | ◉ | 195 | 106 | 19 | X | | |
| 14 | C | 2 | | | ◉ | 319 | 152 | 37 | X | | |
| 15 | C | 3 | | | ◉ | 155 | 98 | 22 | X | | |
| 16 | C | 4 | | | ◉ | 207 | 56 | 17 | X | | |
| 17 | C | PXE | ◉ | 215 | 118 | X | X | | | | |
| 18 | C | polybutene | ◉ | 275 | 56 | X | X | | | | |

It is understood from the results shown in Table 3 that quite excellent results were obtained in Experiments Nos. 1 to 4 wherein the MF capacitors comprised the combination of film A with Impregnating Agent ①, ②, ③ or ④ which is a compound having three aromatic rings. It is also understood from Table 1 that with these combinations, high ratios of the amount of the impregnating agent which penetrated between the base film layers to that which penetrated into the film body were obtained.

As compared with the results of Experiment No. 5, the impregnating agents of the present invention show superior effects.

Though the combination of the film A with dodecylbenzene in Experiment No. 5 had a specific behavior, the time-to-break was not elongated significantly even when the potential gradient was low as compared with the results of Experiments Nos. 1 to 4. Therefore, this capacitor of No. 5 had a life far shorter than those of capacitors in Experiments Nos. 1 to 4 under a practical boltage.

Though, as shown in Table 2, film C satisfied the conditions described in Japanese Patent Laid Open No. 44005/1982, i.e. the rate of change of the film length and amount of diffusion into the film, the combination thereof with Impregnating agent ① exhibited utterly insufficient results in the capacitor tests shown in Table 3 (Experiment No. 13). On the other hand, though the film A does not satisfy the condition of the rate of change of the film length described in said Japanese Patent Laid Open No. 44005/1982, particularly excellent MF capacitors could be obtained by combining the film A with a specific impregnating agent (Experiment No. 1).

It is thus apparent that the characteristics of the impregnated MF capacitors cannot be estimated from their rate of change of the film length nor amount of diffusion. In other words, the estimation is impossible unless the impregnation ratio limited in the present invention is employed.

What is claimed:

1. An impregnated capacitor wherein at least part of the capacitor element comprises a metallized film comprising a polypropylene film as a base film impregnated with an insulating impregnating agent comprising a compound having three condensed or non-condensed aromatic rings, the ratio of the amount of the impregnating agent which penetrates between the base film layers to that of said agent which penetrates into the base film per unit thickness ($\mu$) being at least 60.

2. An impregnated capacitor according to claim 1 wherein the compound having three aromatic rings is a compound of the formula:

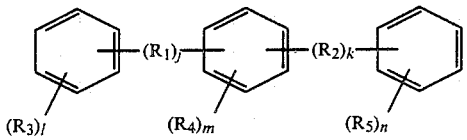

wherein $R_1$ and $R_2$ represent each divalent group derived from a saturated hydrocarbon having 1 to 4 carbon atoms, j and k represent each 0 or 1, $R_3$ to $R_5$ represent each an alkyl group having 1 to 4 carbon atoms, and l, m and n represent each an integer of 0 to 3.

3. An impregnated capacitor according to claim 1 wherein the compound having three aromatic rings is a compound of the formula:

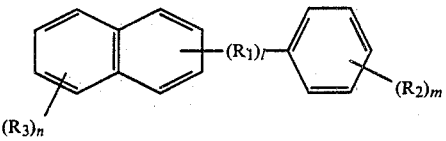

wherein $R_1$ represents a divalent group derived from saturated hydrocarbon having 1 to 4 carbon atoms, l represents 0 or 1, $R_2$ and $R_3$ represent each an alkyl group having 1 to 4 carbon atoms or a cycloalkyl, and m and n represent each an integer of 0 to 3.

4. An impregnated capacitor according to any preceding claim wherein the polypropylene film as the base film is an oriented polypropylene film.

5. An impregnated capacitor according to claim 4 wherein the metal to metallize the base film is aluminum, zinc or their alloy.

6. An impregnated capacitor according to claim 1, wherein a molecular weight of the compound having three aromatic rings is less than 400.

* * * * *